July 3, 1962 R. J. GOODALL 3,041,656
TORSIONAL CASTER
Filed May 31, 1960
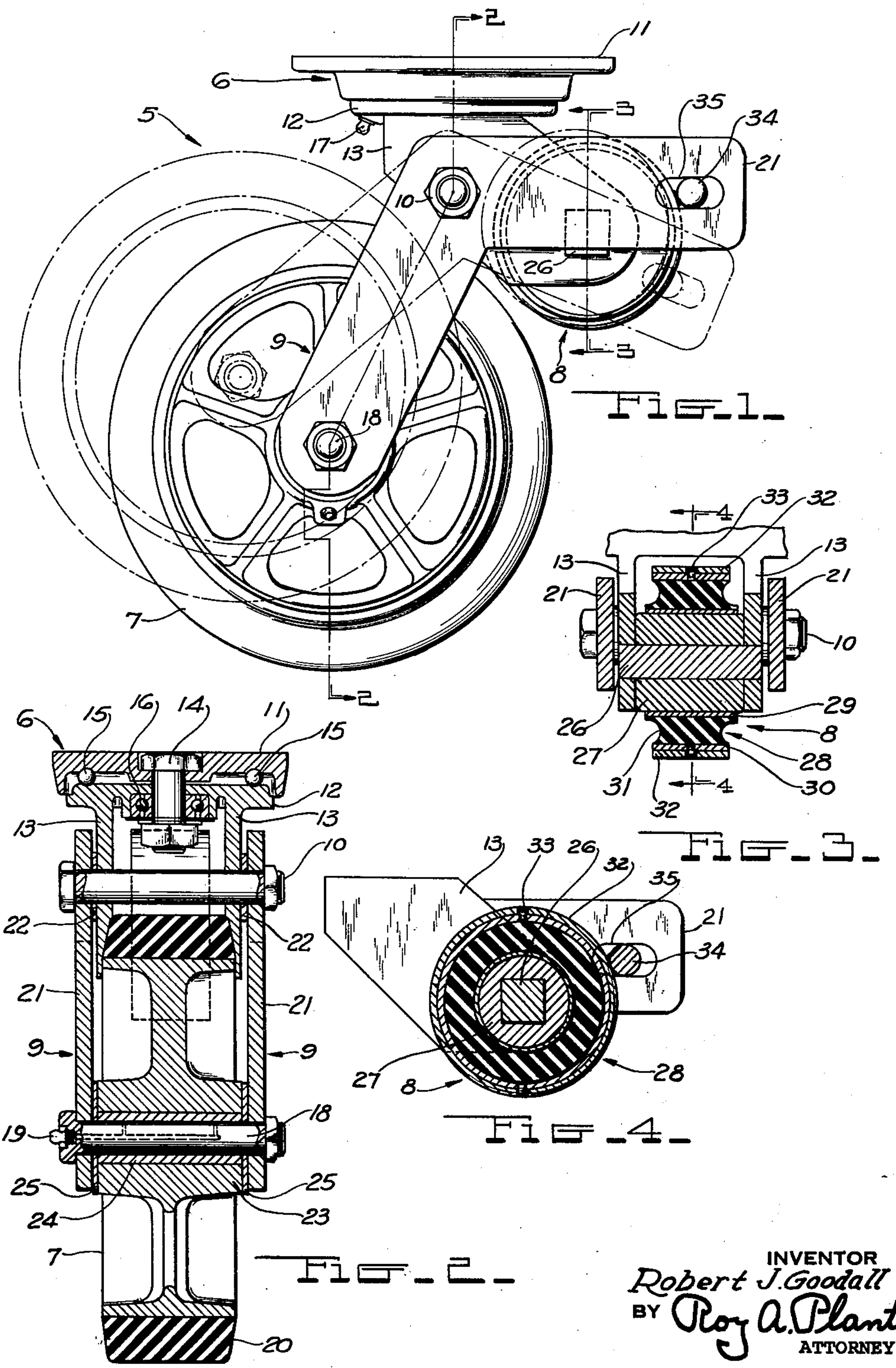
INVENTOR
Robert J. Goodall
BY Roy A. Plant
ATTORNEY United States Patent Office 3,041,656

Patented July 3, 1962

1

2

3,041,656

TORSIONAL CASTER

Robert J. Goodall, Albion, Mich., assignor to Albion Industries, Inc., Albion, Mich., a corporation of Michigan Filed May 31, 1960, Ser. No. 32,826

7 Claims. (Cl. 16—44)

The present invention relates broadly to casters, and in its specific phases to torsional elastic casters.

Ordinary swivel casters, even when provided with rubber tires, and mounted directly on the four corners of a platform member, adapted for moving goods from one place to another, as from department to department in a factory or warehouse, transmit undesired jars and vibrations to the goods being transported, and incidentally are hard on the floor over which the assembly is moved. These caster supported assemblies are universally low in order to reduce to a minimum the distance goods must be lifted or lowered when loading and unloading the assembly with goods to be transported. This rules out the advisability of using springs between the casters and the platform which they are to support.

As a result swivel casters have been made wherein there is a rubber sleeve in the caster wheel between the portion directly at the base of the wheel spokes or web, and the axle sleeve which acts as a sleeve bearing for the axle shaft or pin on which the wheel rotates. This takes up a little rolling shock but not enough to do much good. In another form the caster wheel axle passes through vertical plates which are joined through a pair of vertically mounted rubber discs to the inner face of the caster fork in which the wheel is mounted by means of a horizontal pin or shaft. The rubber is thus entirely in shear and not compression, which limits the load capability and, if heavily loaded, in time the rubber fails. Spiral springs have also been proposed for concentrically wound use in the caster wheel, but these apparently, have proven commercially unsatisfactory, and have been largely eliminated from use. Simple eccentric mountings of the caster wheel on the lower end of the caster fork have also been proposed, but these are of relatively limited load capability and useable where relatively light loads are to be transported. It was a recognition of the limited usability of such constructions and the need of a stronger, more stable, and dependable heavy load capability, cushioned, swivel caster which led to the conception and development of the present invention.

According among the objects of the present invention is the provision of an improved torsional elastic caster assembly which is dependable, simple in construction, and has a relatively high load capability while utilizing both compression and torsion of a resilient sleeve to provide the desired cushioning action for the caster under conditions of use.

Another object is to provide a torsional caster wherein there is a resilient sleeve mounted with fixed axis position relative to the base of the caster, and wherein the caster wheel is mounted on the lower end of an inverted, substantially L-shaped, bell crank form of fork assembly with a fixed pivot at the junction of the two arms of the L, while the outer end of the second arm is provided with a shifting connection to the outer surface of said fixed axis position resilient sleeve so that vertical movement of said caster wheel, when same is on a horizontal surface, is resisted by said resilient sleeve to produce an exceptionally strong and yet resilient caster assembly.

A further object is to provide a torsional caster wherein the caster wheel is not directly connected to the fixed position center of a resilient member of the assembly but rather through the pivotally mounted members on which the caster wheel is rotatably mounted, and wherein there is a variably linkage ratio due to varying of the effective length of the arm connected to the resilient member in step with varying loads on the caster wheel, with the result that such combination is exceptionally satisfactory and more versatile than usual for torsional casters.

Still further objects and advantages of the invention will appear as the description proceeds.

To the accomplishment of the foregoing and related ends, the invention, then, consists of the torsional caster means hereinafter fully described and particularly pointed out in the claims, the annexed drawing and the following description setting forth in detail certain means for carrying out the invention, such disclosed means illustrating, however, but one of various ways in which the principle of the present invention may be used.

In the annexed drawing:

FIGURE 1 is a side elevation of the improved torsional caster of the present invention.

FIGURE 2 is a sectional view as taken on line 2—2 of FIGURE 1, looking in the direction of the arrows.

FIGURE 3 is a sectional view as taken on line 3—3 of FIGURE 1, looking in the direction of the arrows.

FIGURE 4 is a sectional view as taken on line 4—4 of FIGURE 3, looking in the direction of the arrows.

A preferred construction has been illustrated and will be rather specifically described, but attention is invited to the possibility of making variations within the spirit and scope of the invention as illustrated and described.

The torsional caster 5 comprises a base assembly 6, a caster wheel 7, a torsion member 8, and a fork assembly 9 which is pivoted at 10 on the base assembly and carries the caster wheel 7 at one end of same and is resiliently connected at its other end through torsion member 8 to said base assembly 6.

Base assembly 6 has a base plate 11, and a bearing plate 12 with a pair of arms 13, which are preferably parallel and project downward and outward therefrom. A bolt 14, FIGURE 2, passes centrally through base plate 11 and the adjacent portion of the bearing plate 12 which, for minimum frictional resistance to turning relative to each other, are provided with ball bearings 15 between same, and at the under face of bearing plate 12 there is provided a second ball bearing 16 with the bolt 14 tightly fitting and passing centrally therethrough. This second ball bearing 16 is adapted to absorb, with a minimum of friction, eccentric loading on the caster assembly. To facilitate lubrication of ball bearings 15, a suitable grease fitting 17, FIGURE 1, is provided.

Caster wheel 7 is conventionally mounted on the lower end of the fork assembly 9 by means of an axle or shaft 18 provided with a grease fitting 19. The caster wheel 7 may be of any conventional construction, but for further cushioning action such wheel may, if desired, be provided with a rubber tire 20. Fork assembly 9 has two substantially L-shaped bell crank side members 21 pivotally mounted on pivot pin 10 to base assembly 6 and spaced from the outer side of arms 13 of bearing plate 12 by means of thrust washers 22, FIGURE 2. The hub 23 of wheel 7 is preferably fitted with a bushing 24 closely but freely fitting the axle or shaft 18, and at the opposite ends of hub 23 there are a pair of thrust washers 25 which space same from the inner sides of side member 21.

The upper ends of side members 21 of fork assembly 9, extend in a general horizontal direction, before loading, and are symmetrically provided with short slots 35, FIGURE 1, for a purpose to be hereinafter set forth.

The arms 13 of bearing plate 12 are symmetrically provided, adjacent the free ends of same, with a non-round opening, preferably square, adapted to receive the ends of a non-round shaft member 26 which forms the center of torsion member 8. This torsion member 8 has a round periphery, metal, center portion member 27 with a central opening therethrough closely but freely fitting non-round shaft 26 which thus holds the inner portion of torsion member 8 against rotation. This metal center portion member 27 carries on its outer periphery, and anchored thereto in conventional manner, such as by press fitting as shown, a resilient sleeve assembly 28 comprising an inner metal sleeve 29 and an outer metal sleeve 30 which are spaced apart and joined together by bonding with a suitable resilient plastic or rubber sleeve 31. On the outer periphery of outer metal sleeve 30 is a rotatably adjustable sleeve 32 which can be rigidly anchored to outer metal sleeve 30, FIGURE 3, by means of set screws 33, or the like. This adjustable sleeve 32 carries crosswise of its outer face, and parallel to its axis, a rod 34, FIGURES 1 and 4, which is anchored to said sleeve 32 by welding or brazing with the ends of said rod slidably fitting slots 35 in said L-shaped side members 21. This rod 34, when the caster is in non-loaded position, will preferably be adjusted near to but spaced from the outer end of short slot 35 and move first outward and then toward the opposite end of said slot 35 in step with increased loading of said caster. This shifting of the rod 34 in slots 35 under increasing loading of the caster assembly 5 gives the caster itself greater flexibility and good cushioning leverage when increased loading is placed on same. Moreover, the anchored rubber sleeve 31 will absorb the increased load placed on said caster assembly 5, and thus stabilize the assembly.

Referring to FIGURE 1, the solid lines show the caster in substantially unloaded position and with the rod 34, carried by sleeve 32, substantially at the outer end of slot 35 of L-shaped bell crank side members 21. The dashed position of the caster shows one loaded position of same wherein rod 34 has moved inwardly of slot 35, and which end of said slot, if desired, can be located to provide an overload stop for the overall assembly. Shifting of rod 34 in slot 35 under variably loading varies the distance between said rod 34 and pivot pin 10 to vary the leverage exertable by the caster wheel 7, which in turn is resisted more and more by the suitable plastic or rubber sleeve 31 as the loading increases thus giving improved cushioning action. Loading of the caster assembly not only places a torsional load on the resilient sleeve assembly 28, but also some compression load or crosswise shear stresses on the suitable plastic or rubber sleeve member 31 of same, thus more efficiently loading same as compared with one or the other alone.

Attention is again invited to the possibility of making variations within the spirit and scope of the invention as illustrated and described. Directional terms such as "lower," "horizontal," et cetera, have been used to facilitate describing the invention in the position shown in the drawing, and are not to be considered as limiting the invention, since obviously the caster can be used in other positions than on a horizontal surface.

Other modes of applying the principle of my invention may be employed instead of the one explained, change being made as regards the torsional caster means herein disclosed, provided the means stated by any of the following claims or the equivalent of such stated means be employed.

I therefore particularly point out and distinctly claim as my invention:

1. A torsional elastic caster, comprising a base assembly having a base plate, a bearing plate with a pair of downwardly and outwardly extending substantially parallel arms, and means rotatably joining said base plate and bearing plate for rotation relative to each other; a fork assembly having a pair of substantially parallel bell crank shaped arm members with a caster wheel mounted for rotation on the ends of said bell crank-shaped arm members, and means for pivotally mounting said bell crank shaped arm members on the arms of said bearing plate adjacent but spaced outwardly of the central portion of said base plate; and an elastic torsion means connecting the outer ends of said bearing plate arms with the outer ends of said bell crank shaped arm members remote from the ends of same on which said caster wheel is mounted, said elastic torsion means having a center portion member at the outer ends of the arms of said bearing plate, means joining said center portion member in fixed non-rotatable position to said arms of said bearing plate, an outer cylindrical sleeve portion and means shiftably connecting same to said outer end portions of said bell crank shaped arm members, a resilient sleeve assembly, and means joining said resilient sleeve assembly to said center portion member and outer cylindrical sleeve portion of said elastic torsion means.

2. A torsional elastic caster as set forth in claim 1, wherein said center portion member of said elastic torsion means has a substantially cylindrical outer surface with a central non-circular opening extending axially therethrough, and a shaft tightly and non-rotatably fitting said non-circular opening in said center portion member, said arms of said bearing plate having alined openings of suitable size to non-rotatably receive the ends of said shaft passing through said center portion member.

3. A torsional elastic caster as set forth in claim 1, wherein said means shiftably connecting the outer end portions of said bell crank shaped arm members and said elastic torsion means comprises projecting means anchored to the outer cylindrical sleeve portion of said elastic torsion means and having outer ends extending lengthwise beyond the ends of said elastic torsion means and substantially parallel to the axis of the latter, said outer end portions of said bell crank shaped arm members being suitably slotted substantially lengthwise thereof in alinement with each other to slidably receive said outer ends of said lengthwise projecting means for movement of the latter lengthwise of said slot generally in a direction perpendicular to the axis of said elastic torsion means and in a generally arcuate direction to the axis of rotation of said bell crank shaped arm members under varying loading of said elastic caster.

4. A torsional elastic caster as set forth in claim 1, wherein said means connecting said outer cylindrical sleeve portion of said elastic torsion means to the outer end portions of said bell crank shaped arm members is a second sleeve rotatably mounted on the outer face of said outer cylindrical sleeve portion, and means for adjustably anchoring said cylindrical sleeves in various rotated positions relative to each other.

5. A torsional elastic caster as set forth in claim 3, wherein said lengthwise projecting means is in the form of a rod anchored to the outer cylindrical sleeve portion of said elastic torsion means and extending lengthwise of same and slidably fitting the alined slots in the outer end portions of said bell crank shaped arm members, whereby movement of said bell crank shaped arm members as said caster assembly is loaded is resisted by said resilient sleeve assembly through the engagement of said rod in said alined slots of the bell crank shaped arm members.

6. A torsional elastic caster as set forth in claim 3, wherein said elastic torsion means has a second sleeve concentric with said outer cylindrical sleeve portion and rotatably mounted on the outer face of same, means for adjustably anchoring said outer cylindrical sleeve portion and said second sleeve together in various positions relative to each other, said outer end portions of said sidewise projecting means of said elastic torsion means being in the form of a cross rod anchored to the outer face of said second sleeve and having its ends slidably and operably fitting said alined slots in said outer ends of said bell crank shaped arm members, whereby movement of said bell crank shaped arm members as said caster assembly is loaded is resisted by said resilient sleeve assembly through the engagement of the outer end portions of said sidewise projecting means in said alined slots of said bell crank shaped arm members.

7. A torsional elastic caster, having a base assembly with a base plate and a bearing plate, means rotatably connecting said plates, said bearing plate having downwardly and outwardly extending substantially parallel arms, an elastic torsion means, means at the center of said torsion means fixedly and non-rotatably anchoring same to the outer end portions of said arms, a fork assembly having forks of bell crank shape, means pivotally mounting said fork assembly on said substantially parallel arms of said bearing plate with said pivoting being crosswise of said pivotal connection of said plates and adjacent to same, a supporting caster wheel rotatably mounted on one end of said fork assembly, the other end of the forks of said fork assembly being symmetrically slotted substantially in a direction radial to the pivotal axis of said fork assembly, said elastic torsion means having an outer sleeve means, a cross rod anchored to said outer sleeve means with the outer ends of said rod operably fitting said symmetrical slots of the forks of said fork assembly, said cross rod being mounted on said outer sleeve means so as to be above a line joining the center of said torsion means and the pivotal axis of said forks, said slots being substantially lengthwise of said forks of said fork assembly and positioned relative to said rod so that as said torsional elastic caster is gradually loaded said torsion means cross rod will gradually shift in said slots toward said line joining the center of said torsion means with the pivotal axis of said forks and which will shorten the distance between said rod and the axis of said forks assembly, whereby the increasing resistance of said elastic torsion means to increased loading of the torsional elastic caster will be partially relieved, and better cushioning obtained.

References Cited in the file of this patent

FOREIGN PATENTS 518,375 Great Britain ____________ Feb. 26, 1940